United States Patent
Heub et al.

(10) Patent No.: US 12,366,562 B2
(45) Date of Patent: Jul. 22, 2025

(54) METHOD AND DEVICE FOR THE PROVISION OF A SAMPLE

(71) Applicant: Merck Patent GmbH, Darmstadt (DE)

(72) Inventors: Sarah Heub, Lausanne (CH); Aurele Horisberger, Chavannes-Pres-Renens (CH); Younouss Faye, Estavayer-le-Lac (CH); Jean-Baptiste Orhan, Orbe (CH); Olivier Marti, Essertines-sur-Yverdon (CH)

(73) Assignee: Merck Patent GmbH, Darmstadt (DE)

( * ) Notice: Subject to any disclaimer, the term of this patent is extended or adjusted under 35 U.S.C. 154(b) by 952 days.

(21) Appl. No.: 16/641,445

(22) PCT Filed: Aug. 21, 2018

(86) PCT No.: PCT/EP2018/072473
§ 371 (c)(1),
(2) Date: Feb. 24, 2020

(87) PCT Pub. No.: WO2019/038245
PCT Pub. Date: Feb. 28, 2019

(65) Prior Publication Data
US 2020/0200722 A1 Jun. 25, 2020

(30) Foreign Application Priority Data

Aug. 24, 2017 (EP) .................................. 17187746

(51) Int. Cl.
*G01N 30/91* (2006.01)
*G01N 30/92* (2006.01)
(52) U.S. Cl.
CPC ............. *G01N 30/91* (2013.01); *G01N 30/92* (2013.01)
(58) Field of Classification Search
None
See application file for complete search history.

(56) References Cited

U.S. PATENT DOCUMENTS

| 4,354,406 A | 10/1982 | Brun et al. |
| 4,863,610 A * | 9/1989 | Campbell .............. B01D 29/01 210/658 |

(Continued)

FOREIGN PATENT DOCUMENTS

| EP | 1302768 A2 | 4/2003 |
| GB | 2067126 A | 7/1981 |

(Continued)

OTHER PUBLICATIONS

Thin layer chromatography. Wikipedia. Accessed Sep. 11, 2023. (Year: 2023).*

(Continued)

*Primary Examiner* — Kara M Peo
(74) *Attorney, Agent, or Firm* — Millen, White, Zelano & Branigan, P.C.; Brion P. Heaney (57) ABSTRACT

A method is provided for preparing a sample of a specimen to be analysed from a thin-layer plate in thin-layer chromatography. The sample is removed from a surface of the thin-layer plate by means of a blade disposed at a receiving opening of a cannula and fed through the cannula to a specimen chamber connected to the cannula. A reduced pressure can be generated in the specimen chamber to suck the sample removed from the thin-layer plate by means of the cannula through the receiving opening into and through the cannula and into the specimen chamber. After removal and feed of the sample, the specimen chamber can be filled with a solvent to dissolve the sample. The cannula with the blade can be deflected against a spring force or the blade can be deflected against a spring force relative to the receiving opening of the cannula at the receiving opening of the cannula to prevent the blade from penetrating into the thin-layer plate with an excessive contact pressure during the removal of the sample from the thin-layer plate.

21 Claims, 3 Drawing Sheets

(56) References Cited

U.S. PATENT DOCUMENTS

| | | | |
|---|---|---|---|
| 5,208,458 | A | 5/1993 | Busch et al. |
| 6,064,754 | A | 5/2000 | Parekh et al. |
| 6,278,794 | B1 | 8/2001 | Parekh et al. |
| 6,480,618 | B1 | 11/2002 | Parekh et al. |
| 7,485,191 | B2 * | 2/2009 | Axtell ................. B05C 5/02 134/34 |
| 2002/0191825 | A1 | 12/2002 | Parekh et al. |
| 2003/0236471 | A1 | 12/2003 | Fisher |
| 2006/0160127 | A1 | 7/2006 | Hadbawnik et al. |

FOREIGN PATENT DOCUMENTS

| | | |
|---|---|---|
| JP | S5510026 B2 | 3/1980 |
| JP | 2016161477 A | 9/2016 |

OTHER PUBLICATIONS

Thin layer chromatography. Chemistry LibreTexts. Accessed Sep. 11, 2023. (Year: 2023).*
International Search Report dated Nov. 30, 2018 issued in corresponding PCT/EP2018/072473 application (2 pages).
Notification of Reasons for Refusal (1st Office Action) in corresponding JPAppln. No. 2020-511341 dated Sep. 2, 2022 (pp. 1-4).

* cited by examiner

METHOD AND DEVICE FOR THE PROVISION OF A SAMPLE

The invention relates to a method for the provision of a sample of a specimen to be analysed from a thin-layer plate in thin-layer chromatography, where the sample is removed from the thin-layer plate and fed to a specimen chamber.

In thin-layer chromatography, a specimen to be analysed is applied to a starting area of a thin-layer plate. The thin-layer plate has a support plate, usually dimensionally stable, which is coated with a solid and typically fine-pored and/or particulate separating material, such as, for example, silica gel. After the application of the specimen to be analysed to the starting area, a mobile phase is fed to the thin-layer plate, firstly migrating through the starting area of the specimen to be analysed and subsequently through a separation zone in the separating material which extends along the thin-layer plate. The specimen applied to the starting area is entrained by the mobile phase. The stronger the interaction between the specimen or individual components of the specimen and the separating material, the slower the specimen migrates or the individual components of the specimen migrate over the separation zone with the mobile phase. In this way, spatial separation between different specimens or between different components of a specimen can take place due to different migration speeds. After the spatial separation over the separation zone, the individual specimens or the individual specimen components can be evaluated and, for example, identified independently of one another by means of suitable investigations and measuring instruments.

Various methods are known for enabling analysis of the specimen distributed over the separation zone. Specimens that are suitable for this purpose can be detected, for example, using colour reactions or by optical analyses. For other analyses, a sample of the analytical specimen of the thin-layer plate must be detached from a specified area of the separation zone and transferred to a measurement device. To this end, the separation layer located in a specified area on the support plate is usually removed from the support plate with the separating material and the specimen material located therein and eluted, or dissolved, where the separating material is not taken into account in the subsequent evaluation. Various methods and devices have likewise been developed for detaching a sample of a specimen to be analysed from the thin-layer plate.

It is known from practice, for example, that specified areas of the thin-layer plate are irradiated specifically with an intense laser beam and the separating material located there is thereby removed from the support plate together with the specimen material present therein. The laser beam can be focused on a very small area, enabling good spatial resolution to be achieved during removal of a sample of the thin-layer plate. However, it has been found that quantitative analysis is virtually impossible, in particular in the case of specimens which comprise a number of different components, whose reaction to the laser beam and consequently whose removal behaviour may differ significantly, meaning that subsequent analysis and evaluation may be distorted.

It is furthermore known from practice that a hollow cylinder having a ring-shaped seal disposed at an open end of the hollow cylinder is pressed onto the thin-layer plate from above and delimits and seals off a specimen area on the separation layer by means of the ring-shaped seal. A solvent is introduced into the cavity of the hollow cylinder, which dissolves a sample of the specimen to be analysed out of the separation layer in the specimen area delimited by the ring-shaped blade or alternatively dissolves a fraction of the separating material out of the separation layer together with the specimen embedded therein. The solvent enriched with the sample of the specimen to be analysed can then be transferred to a measuring instrument. A disadvantage of this method is the often-inadequate sealing of the specimen area to be analysed, meaning that solvent and any specimen constituents dissolved therein frequently escape from the delimited specimen area. It has been found that a different contact pressure for the hollow cylinder with the ring-shaped seal is necessary in each case for different separation layers and in particular for different support plates in order to effect reliable sealing, which makes the provision of the sample considerably more difficult and makes frequent individual adaptation in routine laboratory work necessary. In addition, a sealing effect that is regarded as adequate often requires such a high contact pressure that the coating of separating material is damaged in the vicinity of the ring-shaped seal and cracks form, for example, in the separation layer or adjacent areas of the separation layer flake off. For this reason, a large spatial separation between two adjacent arrangements of the hollow cylinder on the thin-layer plate is necessary, meaning that closely adjacent specimen areas can only be evaluated incompletely, if at all.

A further problem on use of hollow cylinders having ring-shaped seals is that the separation layers must have a uniform thickness of at least 100 µm. In the case of thinner layer thicknesses of the separating material on the support plate, the separating material compressed by the ring-shaped seal can no longer be compacted sufficiently in order to effect reliable sealing, even in the case of a comparatively high contact pressure of the ring-shaped seal. In view of the desire for fast thin-layer chromatography which can be carried out with little specimen material, however, the thinnest possible separation layer having a thickness of less than 100 µm is advantageous, meaning that the method described above can no longer be used.

A further disadvantage is regarded as being the amount of solvent that is required for complete dissolution of the amount of specimen and that is necessary in order to dissolve the specimen located in the analysis area delimited by the ring-shaped seal out of the separation layer. If a continuous stream of solvent is firstly run to or through the separation layer in the analysis area and subsequently fed to a measuring instrument, for example a mass spectrometer, the individual measurement peaks are comparatively broad due to the requisite amount of solvent and owing to the only gradual dissolution of the specimen out of the separation layer, which makes evaluation thereof more difficult.

It is likewise known to move a capillary or pipette tip closely over the surface of the thin-layer plate and to bring a droplet of a suitable solvent hanging on the capillary into contact with a specimen area on the thin-layer plate. During a contact duration of, for example, a few seconds, a sample of the specimen to be analysed is dissolved out of the specimen area in the hanging droplet, which can subsequently be sucked through the capillary and transferred to a measuring instrument together with the sample dissolved therein. However, this method can only be used in the case of separation layers that have sufficiently hydrophobic properties in order that the droplet is not adsorbed by the separation layer, but instead can be sucked through the capillary again after dissolution of the sample out of the area of the separation layer with which the droplet is in contact.

These methods known from practice for the provision of a sample of a specimen to be analysed from a thin-layer plate already enable rapid and substantially automated analysis of a specimen which has been spatially separated over a separation zone of the thin-layer plate. However, it is regarded as a disadvantage of the methods known from practice that the surface of the thin-layer plate that is required for an individual analysis of a specimen and from which the sample of the specimen to be analysed is taken cannot be below a minimum size which is predetermined by the ring-shaped seal or by the droplet size. At present, ring-shaped seals having an oval cross-sectional area of 2 mm×4 mm or having a circular cross-sectional area of about 4 mm in diameter are known and usual. In many cases, a droplet size of likewise about 2 mm in diameter arises on use of commercially available apparatuses with capillaries, which leads to a contact area which is often of comparable size.

In many cases, the specimen to be analysed can be spatially distributed significantly more finely in the separation zone than can be spatially resolved using the methods known from practice for the provision of a sample of the specimen to be analysed. Thus, for example, a number of specimen areas that are spatially delimited from one another in the separation zone would be collected simultaneously by the droplet hanging from the capillary and thus submitted for a single analysis.

It is therefore regarded as an object of the present invention to design a method for the provision of a sample of a specimen to be analysed from a thin-layer plate in such a way that the sample originating from the thin-layer plate for analyses can be taken from a well-defined area of the thin-layer plate that is spatially as small as possible.

This object is achieved in accordance with the invention in that the sample is removed from a surface of the thin-layer plate by means of a blade disposed at a receiving opening of a cannula and is fed through the cannula to the specimen chamber connected to the cannula. The sample of the specimen here is the fraction of the specimen that is located in a certain section of the separating material after separation by thin-layer chromatography has taken place. In accordance with the method according to the invention, the sample of the specimen is removed with the section of the separating material in which it is located. The cannula can be a hollow needle, in which an edge delimiting the receiving opening is formed at least in part as a blade. It is likewise conceivable for the receiving opening of the cannula not to have a blade, but instead to have, for example, a blunt or rounded-off shape or to be widened in a funnel shape, and for a blade made separately to be connected to the cannula in the region of the receiving opening and to be aligned in a suitable manner in such a way that a sample removed from the thin-layer plate by means of the blade can be introduced or fed into the cannula through the receiving opening. In this case, the cannula can be shaped like a capillary or a tubular hollow cylinder.

In accordance with the invention, a cannula is preferably a thin tube, a hose or a hollow needle, typically made from plastic or preferably metal. The diameter of the cannula is typically constant over its length. However, it may also vary.

A diameter of the cannula can be very small and can be, for example, only one millimetre or less, e.g. between 0.3 and 1.5 mm, preferably between 0.5 and 1 mm. By means of a very thin cannula and a blade which forms the edge of the receiving opening at the open end of the cannula, the sample can be removed from the thin-layer plate specifically from a very small analysis area of, for example, 0.5 mm×1 mm or less. A very high spatial resolution is thus also possible during removal of the samples of the thin-layer plate that are necessary for subsequent analyses. Since the sample is removed mechanically with the aid of the blade, no solvent is necessary for this step of the method. Dissolution of the removed sample or the amount of specimen present therein can be carried out at a later point in time using an amount of solvent which is preferably as small as possible. In this way, comparatively sharp measurement peaks can be generated, for example during subsequent measurement using a mass spectrometer with a small amount of solvent, facilitating simple and accurate evaluation. In addition, the device according to the invention and the method according to invention enable the increase in the measurement sensitivity. The very precise removal of areas or bands of defined small size reduces the risk of contamination by adjacent specimen bands. The possibility of taking up the sample removed in a small amount of solvent also enables the measurement of even small amounts of a specimen substance that would, for example, be below the detection limit in the case of greater dilution.

It is likewise conceivable and, in particular in combination with a separately produced blade, advantageous for the cannula to have a greater diameter of, for example, two, three or more millimetres, preferably between 2 and 5 mm. The blade disposed at the receiving opening of the cannula itself advantageously has the smallest possible dimensions of, for example, one millimetre or less in order to be able to set the sample removed by the blade as small as possible during displacement of the blade on or through the thin-layer plate. In this way, it is possible for the sample to be dissolved out of a very small and spatially narrowly delimited surface region of the thin-layer plate by the scraping-off or cutting-out of material from the separation layer of the thin-layer plate and to be fed through the cannula to the specimen chamber.

The specimen chamber can be a container connected directly to the cannula. The cannula can be permanently or detachably connected to the container. It is likewise possible for the specimen chamber to be an area integrated into the cannula or to be a section of the cannula in which the sample removed by means of the blade at the receiving opening and introduced into the cannula through the receiving opening can be collected.

The cannula is advantageously disposed immediately above the surface of the thin-layer plate during the removal operation, so that essentially all of the sample separated out of the thin-layer plate by means of the blade is transported through the receiving opening into the cannula and subsequently through the cannula into the specimen chamber. In this way, it is achieved, even without additional measures, that only a negligibly small proportion of the sample separated out of the thin-layer plate is not collected through the capture opening of the cannula, but instead may be lost for the subsequent analysis. In order to reduce the risk that individual particles of the sample removed from the surface of the thin-layer plate by means of the blade do not pass through the receiving opening into the cannula and subsequently into the specimen chamber, the thin-layer plate can be arranged with the surface containing the specimen to be analysed facing downwards and the cannula with the blade can be moved towards the thin-layer plate from below. The sample particles removed from the thin-layer plate by means of the blade fall downwards into the cannula disposed there owing to gravity.

In order to facilitate the most complete collection possible of the sample removed from the thin-layer plate by means of the cannula, it is provided, in accordance with an embodiment of the inventive idea, that a reduced pressure is generated in the specimen chamber in order to suck the sample removed from the thin-layer plate by means of the cannula through the receiving opening of the cannula and through the cannula into the specimen chamber. The reduced pressure generated in the specimen chamber generates a suction effect, causing air in the environment of the receiving opening of the cannula to be sucked in and sucked through the cannula into the specimen chamber. The sample particles separated off from the thin-layer plate by means of the blade disposed at the receiving opening of the cannula are collected and sucked through the cannula into the specimen chamber. The specimen chamber is separated from a vacuum generation device by a suitable filter device, so that the sample particles sucked into the specimen chamber are retained there.

Irrespective of whether the collection of the removed sample by the cannula is supported by means of a reduced pressure or not, it is possible, by means of the method according to the invention, to remove a small sample of the specimen to be analysed from a spatially narrowly delimited analysis area on the thin-layer plate and feed it to the specimen chamber. Investigations have shown, for example, that, given a suitable design of the blade and cannula, it is readily possible to separate off thin strips of the specimen to be analysed having a width of less than 0.5 mm or even of less than 0.3 mm from the thin-layer plate by means of the blade and to feed essentially all of the sample that has been separated off in the process through the cannula to the specimen chamber. Such a strip can have a very short length of 1 mm or less. The length of the strip can also be, for example, 5 mm or 10 mm long. The length of the strip is advantageously matched to a width of a separation zone, which can be, for example, 4 mm in the case of standard thin-layer plates. With a strip having a length of 5 mm or 6 mm which is aligned transversely to the course of the separation zone, an analysis area which extends over the entire width of the separation zone can then be removed. In this way, it is also possible to carry out quantitative analyses.

The blade can be moved over the surface of the thin-layer plate at a speed of more than 10 mm, preferably more than 20 mm or even more than 25 mm per second, for example between 10 and 40 mm per second, so that the total time necessary for removal of the sample required for an analysis can be kept very short and in the region of a few seconds. The speed can also be specified to be significantly less and can be, for example, less than 10 mm or less than 5 mm per second, for example between 0.5 and 10 mm per second. In particular in the case of a short strip length or essentially punctiform removal of the sample from the thin-layer plate, a speed of 1 mm per second or less may also be advantageous. Overall, the speed with which the blade is displaced over the surface of the thin-layer plate is thus freely selectable matched to the removal problem, typically in a range between 0.5 mm and 100 mm per second, preferably between 1 and 40 mm per second.

In order to remove a larger sample from the thin-layer plate, a number of strips arranged alongside one another can be removed successively by means of the blade and a specified analysis area on the thin-layer plate can thereby be removed completely. It is likewise possible to arrange a number of cannulas and specimen chambers, each with one or more blades, alongside one another in order to carry out a number of removal operations simultaneously.

In order to be able to remove both very small samples in a spatially narrowly delimited analysis area and also, by comparison, very large samples in a significantly larger analysis area from the thin-layer plate in the shortest possible method duration in each case, it may be advantageous to keep a plurality of different cannulas with blades of different widths ready and to use the most suitable cannula with the associated blade for the respective objectives. It is likewise possible, in the case of a separately produced blade disposed on the cannula, to exchange just the blade and match it to the respective analysis area on the thin-layer plate.

In order to be able to store the sample collected in the specimen chamber in an advantageous manner and transfer it to a measurement apparatus at a given time, it is optionally provided that the specimen chamber is filled with a solvent after the removal and feed of the sample in order to dissolve the sample. For this purpose, the specimen chamber can, for example, be sealed in an entry area to the cannula in order to prevent unintentional escape of the solvent and in particular of the sample collected in the specimen chamber. It is likewise possible to seal the cannula at its receiving opening and to fill it with the solvent together with the specimen chamber. The unsealed specimen chamber can optionally also be filled with solvent given a suitable alignment of the specimen chamber and the cannula connected thereto, with the receiving opening of the cannula being directed upwards and the solvent volume being predetermined in such a way that no solvent and in particular no sample collected therein escapes even from an unsealed specimen chamber. The sample dissolved in the solvent can remain in the specimen chamber and be introduced directly into a measurement apparatus from the specimen chamber at a given time. It is likewise possible to transfer the sample dissolved in the solvent out of the specimen chamber into a storage container in order to store and accommodate the dissolved sample until the analysis can be carried at a given time out using a suitable measurement apparatus. It is likewise conceivable for the specimen chamber to be detachably connected to the cannula and to be separated from the cannula and exchanged after filling with the sample and before filling with the solvent, optionally also after filling with the solvent, and can subsequently serve as transport and storage container for the sample collected therein.

In order to avoid contamination of a subsequent removal of a sample from the thin-layer plate by a prior removal of another sample from the thin-layer plate, it is provided that the specimen chamber and the cannula can be cleaned with a cleaning agent. For this purpose, the specimen chamber and the cannula can, for example, be cleaned with the cleaning agent immediately after the preceding removal of a sample, or alternatively immediately before commencement of the removal of a subsequent sample. The cleaning fluid used can be, for example, the same solvent with which the sample collected in the specimen chamber is dissolved. It is likewise conceivable to use a cleaning fluid which is different from this solvent. Furthermore, it may be advantageous firstly to flush one or more cleaning fluids through the specimen chamber and the cannula in order to clean the specimen chamber and the cannula, and subsequently to blow out any remaining residues of the cleaning fluid and in particular of the previously removed the sample using compressed air or another suitable cleaning gas. If the specimen chamber is detachably connected to the cannula and is used as storage container for the sample in question after collection of the removed sample, it is also possible only to clean the cannula with cleaning fluid and/or a cleaning gas and subsequently to connect it to a fresh specimen chamber.

According to an embodiment of the inventive idea, it is provided that the cannula with the blade is deflected against a spring force or that the blade at the receiving opening of the cannula is deflected against a spring force relative to the receiving opening of the cannula in order to prevent the blade from penetrating into the thin-layer plate with an excessive contact pressure during removal of the sample from the thin-layer plate. For taking of the sample from the thin-layer plate, the blade should remove the separation layer as completely as possible. The thickness of the separation layer is, for example, 200 μm in case of conventional thin-layer plates and about 100 μm in the case of very thin separation layers. However, thicker separation layers or alternatively significantly thinner separation layers having a thickness of less than 80 μm or even of less than 50 μm, for example between 30 and 200 μm, can also be removed reliably and completely using the blade and device of the present invention. In the case of such thin separation layers, pressing of a hollow cylinder having a ring-shaped seal, for example, would no longer work, since adequate compression of the separation layer material and thus reliable sealing by the pressed-on ring-shaped seal cannot take place in such a thin separation layer.

However, when the blade is displaced relative to the surface of the thin-layer plate, the blade should be prevented from penetrating into the thin-layer plate with an excessive contact pressure and, for example, penetrating past the separation layer into the support plate or scraping along the support plate, in order to prevent damage to the thin-layer plate and any risk of contamination of the removed sample or undesired damage to the blade or cannula.

The spring force exerted on the blade in this case is advantageously specified in such a way that the blade lies on the surface of the thin-layer plate with a sufficiently high contact pressure in order to be able to penetrate into the separation layer on an extension of the blade transversely to the surface and to be able to remove the desired sample. At the same time, the spring force is advantageously set sufficiently low in order to enable displacement of the blade perpendicular to the support plate in the case of undesired contact with the support plate of the thin-layer plate and to prevent damage to the thin-layer plate. Adaptation to separation layers comprising different materials and having different thickness can be carried out easily by means of a suitably designed spring device.

For this purpose, the blade or cannula can be disposed on a suitable holding device so as to be displaceable about a horizontally directed pivot axis. It is likewise conceivable for the blade or cannula to be mounted in a positive guide directed perpendicular or at an angle to the thin-layer plate and subjected in this positive guide to a spring force of a suitable spring device.

According to an advantageous embodiment of the inventive idea, it is provided that the cannula and the surface of the thin-layer plate are displaced relative to one another by means of a displacement device in order to remove the sample from the thin-layer plate. The displacement device can be, for example, an X-Y stage which can be moved automatically, on which the thin-layer plate can be disposed and fixed. Suitable control and displacement of the X-Y stage enables the thin-layer plate then to be displaced relative to a cannula of fixed location and the associated blade. The cannula with the blade or alternatively the X-Y stage can then advantageously be moved relatively towards one another or away from one another in order to move an analysis area on the surface of the thin-layer plate and the cannula, which are initially at a distance from one another, towards one another. The thin-layer plate can subsequently be moved towards the blade and the separation from one another can be reduced until contact or penetration of the blade into the separation layer of the thin-layer plate in order to remove the desired sample from the thin-layer plate on subsequent movement of the thin-layer plate transversely to the cannula with the blade.

It is likewise expedient, and advantageous for automated removal of the desired sample, that the cannula with the blade are arranged on a suitable displacement head, which can be moved automatically relative to a thin-layer plate of fixed location, at least parallel to the surface of the thin-layer plate and advantageously also perpendicular to the thin-layer plate. In an embodiment of this type, the specimen chamber can be rigidly connected to the cannula or to the displacement head or alternatively connected to the movable cannula via a flexible connecting line and at the same time fixed in location on a suitable holder or bearing device.

In order to facilitate substantially automated specimen analysis, it is advantageously optionally provided that an optical image of the surface of the thin-layer plate containing the specimen to be analysed is generated by means of an optical recording device and that an area on the surface of the thin-layer plate within which the cannula is displaced relative to the surface of the thin-layer plate by means of the displacement device in order to remove the sample from thin-layer plate is specified by means of an evaluation device. The optical recording device can have, for example, a line-scan or array CCD camera or CMOS camera, with which an optical image of the surface of the thin-layer plate can be recorded. In order to increase the recording quality and to enable comparability of the optical recordings through illumination that corresponds as closely as possible, the area covered by the optical image can be illuminated by means of an illumination device of suitable design.

It is likewise possible, and advantageous for certain analyses, to illuminate the surface of the thin-layer plate with UV light or with infrared light and to record the light emitted by the surface of the thin-layer plate by means of the optical recording device and convert it into a suitable image. In this way, luminescence effects can also be generated and used for the evaluation. The areas in the separation zone of the thin-layer plate in which a concentration of the specimen to be analysed that is visible or can be recorded in another manner can be identified automatically using a suitable algorithm and selected for subsequent removal of the sample in the individual areas which are spatially delimited from one another. In this way, a surface of the thin-layer plate can be evaluated in full starting from an optical image generated in a suitable manner, in order subsequently to remove the sample desired in each case in the automatically identified analysis areas, in separate removal steps in each case, and submit it for separate analysis.

The invention also relates to a device for the provision of a sample of a specimen to be analysed from a thin-layer plate in thin-layer chromatography, where the device has a removal device for the removal of the sample from the thin-layer plate and a specimen chamber, in which the sample can be collected and provided for subsequent analysis. In accordance with the invention, it is provided that the removal device has a cannula having a blade disposed at a receiving opening of the cannula, and the cannula is connected to the specimen chamber via an optional connecting device. The specimen chamber can be a container connected directly to the cannula. The cannula can be connected to the container permanently or alternatively in a detachable manner. It is likewise possible for the specimen chamber to be an area integrated into the cannula or to be a section of the cannula in which the sample removed by means of the blade at the receiving opening and introduced into the cannula through the receiving opening can be collected. The length of the cannula can be adapted depending on the design of the device and can be, for example, between 5 mm and 50 cm.

The optional connecting device by means of which the cannula is connected to the specimen chamber can be, for example, an adapter or an opening through which the cannula projects into the specimen chamber. It is likewise conceivable for the cannula to be connected to the specimen chamber via a dimensionally stable or flexible connecting line.

By means of the blade disposed at the receiving opening of the cannula, a sample with a specimen to be analysed can be separated off or scraped off from an area of the separation layer of the thin-layer plate. The sample, which is usually removed in the form of small particles, can be fed through the cannula and via the connecting device to the specimen chamber. Undesired loss of the sample removed from the thin-layer plate can be substantially prevented by a suitable design of the cannula and in particular of the receiving opening and by a suitable arrangement of the blade relative to the receiving opening.

According to an advantageous embodiment of the inventive idea, it is provided that the blade forms an edge of the receiving opening of the cannula. An end of the cannula facing away from the specimen chamber can have, for example, an oblique cut, which forms a blade at least along part of a peripheral edge of the oblique cut. It is likewise conceivable for the cannula to be cut off or separated off perpendicularly at its end facing away from specimen chamber and to have, along the peripheral edge, at least one blade extending over part of the peripheral edge. The cannula here can preferably have a circular cross-sectional area, or alternatively a cross-sectional area which is oval, rectangular or of virtually any desired shape.

Since, in the embodiments outlined above, the blade forms an edge of the receiving opening of the cannula, it can be achieved, through suitable displacement of the cannula over the surface of the thin-layer plate during the removal of the sample from the thin-layer plate, that the sample removed is introduced or pushed into the cannula through the receiving opening. The surface of the thin-layer plate can optionally be aligned perpendicular or at an angle to a horizontal alignment, so that particles which have already been separated off fall downwards owing to gravity and fall or slide in the direction of the receiving opening of the cannula, which is expediently then disposed there.

According to an optional embodiment of the inventive idea, it is likewise conceivable for the blade to be disposed at a distance from an edge of the receiving opening of the cannula. In this case, the cannula can be in the form of a hollow needle or tubular hollow body. A cross-sectional area of the hollow needle or hollow body can be specified virtually as desired. The blade, advantageously made separately from the cannula, can subsequently be fixed to the cannula in the region of the receiving opening of the cannula. In this way, it is possible for the blade to consist of a different material than the cannula. The blade can preferably be made of a particularly hard and durable material, such as, for example, metal, while the cannula can likewise consist of metal or be made of an inexpensive or even elastic or flexible material, such as, for example, a suitable and highly inert plastic.

In addition, it is possible not only for the blade to be made separately, but also to be disposed on the cannula in a detachable or exchangeable manner. It is likewise conceivable for a plurality of blades to be disposed on the cannula, for example in a revolver magazine or at a separation from one another in the peripheral direction, so that a change to another blade or blade geometry can be carried out without significant loss of time.

In order to simplify highly reliable, uniform and simple removal of the sample from the thin-layer plate, it is provided, according to an embodiment of the inventive idea, that the blade has a cutting edge which runs in a straight line, at least in part. The blade can have, for example, a cutting edge running in a straight line with a length of 0.5 mm or 1 mm, typically a length of between 0.3 and 5 mm, preferably a length of between 0.5 and 2 mm. Delimiting elements which project transversely to the blade edge can be disposed on the edges of the blade edge running in a straight line in order to facilitate the separation and removal of strip-shaped sample areas.

In order to avoid undesired damage to the thin-layer plate or excessively deep penetration of the blade into the thin-layer plate during displacement of the cannula with the blade over the thin-layer plate during a removal operation, it is optionally provided that the cannula with the blade is supported on a support device against a spring force, or that the blade is supported relative to the cannula or specimen chamber via a spring device. The spring device can be, for example, a coil spring, which is subjected to tension or compression in the case of deflection of a blade which can be displaced in a pivotable or translatory manner. Likewise known are rotational spring devices which generate a restoration force in the case of a rotational movement caused by pivoting of the blade.

If the blade is formed as a constituent of the cannula and forms an edge of the receiving opening of the cannula, the cannula with the blade can be supported on a supporting device in a displaceable manner and the spring device can generate a restoring spring force on displacement of the cannula relative to the supporting device. If the blade is made separately from the cannula and attached thereto, the cannula with the blade can likewise be supported on a supporting device in a displaceable manner and the spring device can generate a restoring spring force on displacement of the cannula relative to the supporting device. It is likewise conceivable for only the blade to be supported on the cannula, on the specimen chamber or on a separate supporting element via a spring device of suitable design.

If the cannula is displaced with its receiving opening a small distance above the surface of the thin-layer plate, the blade supported on the cannula, for example in a pivotable or axially displaceable manner, can be pressed into the separation layer of the thin-layer plate and the sample can thereby be removed and introduced into the cannula.

In connection with the method according to the invention outlined above, it has already been described that the specimen chamber can optionally have an opening which is connected to a reduced-pressure generation device. The specimen chamber can also be connected to a solvent filling device via the same opening or a further opening. In addition, the specimen chamber can be connected to a cleaning-fluid filling device, either likewise via the same opening or alternatively through a separate opening.

This one opening or, where appropriate, the plurality of openings by means of which the specimen chamber is connected to further components are, in accordance with an embodiment of the inventive idea, sealed by a filter device which retains the sample that has been removed and transferred into the specimen chamber in the specimen chamber. The filter device can be, for example, a glass, metal or ceramic frit, where the filter material of the frit has pores with specified pore widths, so that the sample collected in the specimen chamber after the removal is retained in the pore chamber by the frit if liquids flow through the pore chamber. Instead of a frit, it is also possible to use other suitable sieves or sieve materials, such as, for example, meshes or grid structures. The filter device can also have a membrane or alternatively a metal filter, for example comprising a sintered porous metal structure.

It is advantageously optionally provided that the cannula with the blade and a surface of the thin-layer plate can be displaced relative to one another by means of a displacement device. The displacement device here may displace either only the cannula and the blade over the surface of the thin-layer plate or alternatively displace and move the specimen chamber with the cannula and blade rigidly attached thereto relative to the surface of the thin-layer plate. The displacement device can have, for example, a carriage or displacement head which can be displaced in one plane or in all three spatial directions. It is also conceivable for the displacement device to have an accommodation stage for accommodation of the thin-layer plate which can be displaced in one plane or in all three spatial directions. A thin-layer plate fixed to the accommodation stage can then be displaced in the desired manner relative to the cannula of fixed location together with the accommodation stage. It is likewise conceivable for the device to have a plurality of cannulas with specimen chambers connected thereto, which can be displaced simultaneously independently of one another over areas of the thin-layer plate at a separation from one another and at the same time can in each case remove a sample of a specimen to be analysed.

With a view to automatic recording, which is advantageous for many applications, of the analysis areas in which a sample is in each case to be removed for a subsequent specimen analysis, it is provided, in accordance with a corresponding embodiment of the inventive idea, that the device has an optical recording device for recording an optical image of the surface of the thin-layer plate and an evaluation device, by means of which it is possible to specify an analysis area on the surface of the thin-layer plate within which the cannula is automatically displaced relative to the surface of the thin-layer plate by means of the displacement device in order to remove the sample from the thin-layer plate.

Some illustrative embodiments of the invention are explained in greater detail below by way of example and are depicted diagrammatically in the drawing, in which.

BRIEF DESCRIPTION OF THE DRAWINGS

FIGS. 1 to 5 show various embodiments of a device 1, according to the invention in each case, by means of which a sample of a specimen to be analysed can be removed from a thin-layer plate 2 and fed to a specimen chamber 3. The thin-layer plate 2 has a dimensionally stable support plate 4, to which a separation layer 5 comprising a suitable separating material, for example silica gel, has been applied. The specimen to be analysed has been applied to the thin-layer plate 2 and spatially separated with the aid of a conventional separation method in a separation zone generated in the separation layer 5.

The specimen chamber 3 can be connected to a measuring instrument, not depicted in the figures, in order to transfer the sample collected in the specimen chamber 3 to the measuring instrument. The sample can also be transported and stored in the specimen chamber 3 in order to facilitate evaluation of the sample at a later point in time.

Figure 1:
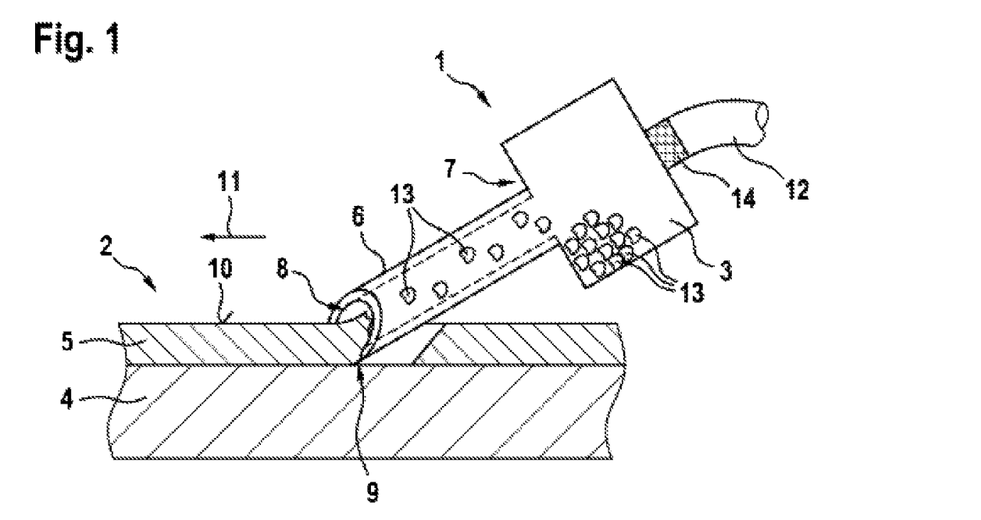
FIG. 1 shows a diagrammatic representation of a device for the provision of a sample of a specimen to be analysed from a thin-layer plate, where only a cannula and a specimen chamber are shown during a removal operation of the sample from the thin-layer plate.

In the illustrative embodiment depicted by way of example in FIG. 1, the device 1 has a cannula 6 having a circular cross-sectional area. The cannula 6 runs at one end 7 into the specimen chamber 3 connected thereto. At an end facing away from the specimen chamber 3, the cannula 6 has a receiving opening 8 having an oblique cut. A peripheral edge of the receiving opening 8 forms a blade 9 in a peripheral section. The blade 9 has a straight course over a length of about 0.5 mm.

In order to remove the sample required for subsequent analyses in a specified analysis area of the thin-layer plate 2, for example in a rectangular area of 1 mm×20 mm on a surface 10 of the thin-layer plate 2, the cannula 6 with the specimen chamber 3 connected thereto is moved towards the surface 10 of the thin-layer plate 2 until the cannula 6 with the blade 9 penetrates into the separation layer 5. The cannula 6 with the blade 9 facing the support plate 4 is subsequently displaced transversely to the surface 10 in a removal direction indicated by an arrow 11, where the material of the separation layer 5 is removed with the sample of the specimen to be analysed located therein and is conveyed through the receiving opening 8 of the cannula 6 into the cannula 6 and subsequently into the specimen chamber 3. For this purpose, the specimen chamber 3 is connected via a connecting line 12 to a reduced-pressure generation device, not depicted in greater detail, by means of which a reduced pressure is generated in the specimen chamber 3, so that particles 13 of the separation layer 5 removed from the thin-layer plate 2 by means of the blade 9 are sucked into the cannula 6 and through the cannula 6 into the specimen chamber 3. A frit 14 disposed in a transition region of the specimen chamber 3 into the connecting line 12 prevents the particles 13 of the sample that have been sucked into the specimen chamber 3 and collected there from being sucked out of the specimen chamber 3 by the reduced-pressure generation device.

Figure 2:
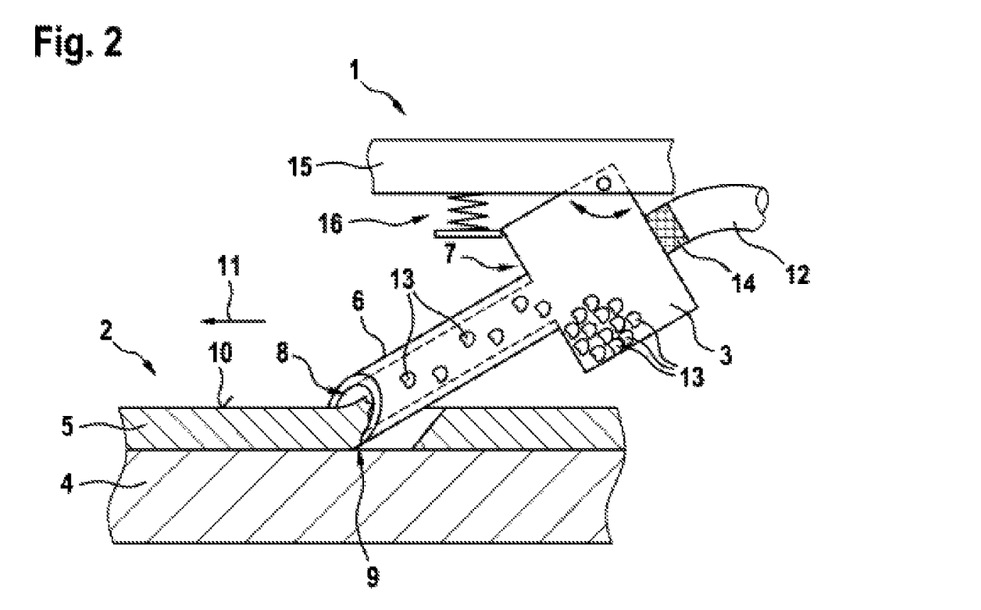
FIG. 2 shows a diagrammatic representation of a device having a different design from FIG. 1.

In the illustrative embodiment depicted in FIG. 2, the specimen chamber 3 with the cannula 6 attached thereto is mounted in a pivotable manner on a supporting device 15, not depicted in greater detail. At the same time, a spring force which pushes the specimen chamber 3 with the cannula 6 disposed thereon away from the supporting device 15 in the direction of the thin-layer plate 2 is generated by means of a spring device 16. If the specimen chamber 3 with the cannula 6 is, for example, unintentionally moved too close to the thin-layer plate 2, the cannula 6 can be pivoted away from the thin-layer plate 2 in the direction of the supporting device 15 against the spring force generated by the spring device 16 and the cannula 6 can thereby be prevented from acting on the support plate 4 with an excessive contact pressure and damaging the latter. The arrangement of the specimen chamber 3 and the spring device 16, depicted merely by way of example and diagrammatically in FIG. 2, can also be designed in a different way in a manner which is readily evident for a person skilled in the art.

Figure 3:
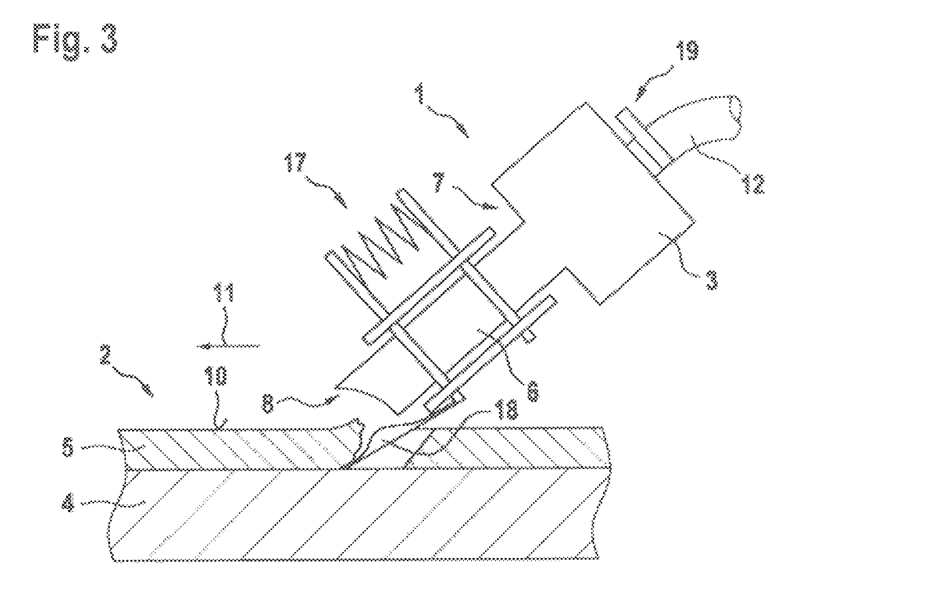
FIG. 3 shows a diagrammatic representation of a device which is again of different design from FIGS. 1 and 2.

In the illustrative embodiment depicted by way of example in FIG. 3, the cannula 6 has a separately made blade 18 which is mounted in an axially displaceable manner on the cannula 6 via a spring device 17. The blade 18 is made of a different material than the cannula 6. The cannula 6 does not have an oblique cut at the receiving opening 8 and does not have a further blade. Through the use of a separate blade 18, a diameter of the cannula 6 can be specified independently of the length of the blade 18, so that, for example, a comparatively short blade 18 having a length of about 0.5 mm to 1 mm can be combined with a cannula 6 whose receiving opening 8 has a diameter of several millimetres, for example 5 mm or 10 mm. In combination with a suitable reduced pressure, collection of virtually all of the sample separated off from the thin-layer plate 2 by means of the blade 18 can be ensured in this way and at the same time the analysis area on the thin-layer plate 2 collected by the blade 18 can be specified to be very small, for example only 0.5 mm×5 mm. The specimen chamber 3 is connected to a connecting line 12 to a solvent container, not depicted in greater detail, not via a frit 14, but instead via a suitable sealing device 19. However, a frit, not depicted in FIG. 3, is expediently used for the connection to a reduced-pressure generation device.

Figure 4:
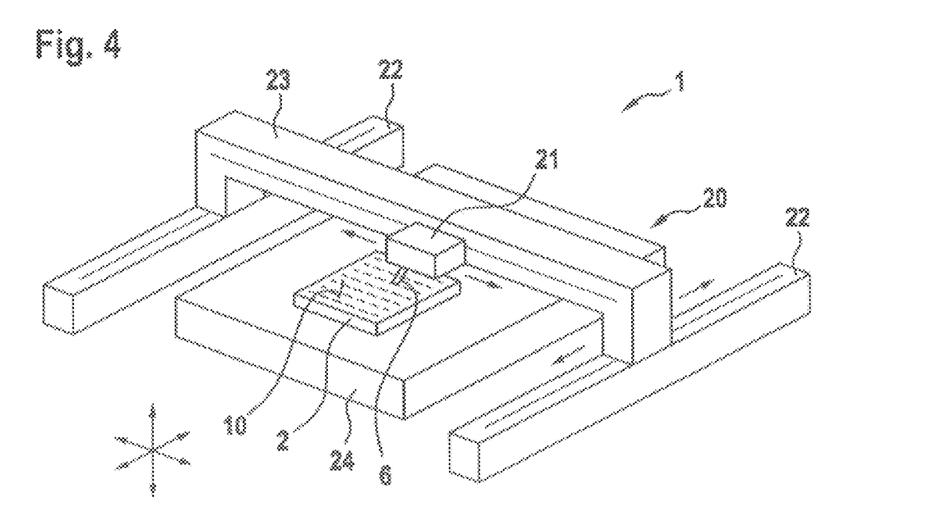
FIG. 4 shows a diagrammatic representation of a displacement device by means of which the cannula can be displaced automatically relative to the thin-layer plate during a method for the removal of the sample.

With a view to provision of a sample of a specimen to be analysed from a thin-layer plate 2 in a highly automated manner, the cannula 6 with the specimen chamber 3 can also be disposed on a displacement device 20, which is depicted by way of example in FIG. 4. The displacement device 20 has a displacement head 21, which is disposed in a displaceable manner on a portal 23 run on rails 22. The cannula 6 is itself disposed in a displaceable manner on the displacement head 21 transversely to the portal 23. In this way, the cannula 6 can be displaced automatically in all spatial directions and the sample necessary for the analysis can be removed from a specified small analysis area of a thin-layer plate 2 disposed, for example, in a fixed location below the displacement head 21.

It is likewise conceivable, and also depicted in a simplified manner in FIG. 4, for the thin-layer plate 2 alternatively or additionally to be fixed on an accommodation stage 24 which can be displaced in one plane or in all three spatial directions. Displacement of the accommodation stage 24 allows the thin-layer plate 2 to be displaced relative to the cannula 6, which is either in a fixed location or can itself be displaced, in order to enable the sample to be removed from the analysis area of the thin-layer plate 2.

In addition, an optical recording device and an evaluation device by means of which it is possible to carry out automated recording of the surface 10 of the thin-layer plate 2 and specification of analysis areas in which automated removal of the samples is subsequently to be carried out for subsequent analyses, can also be disposed in the displacement head 21.

Figure 5:
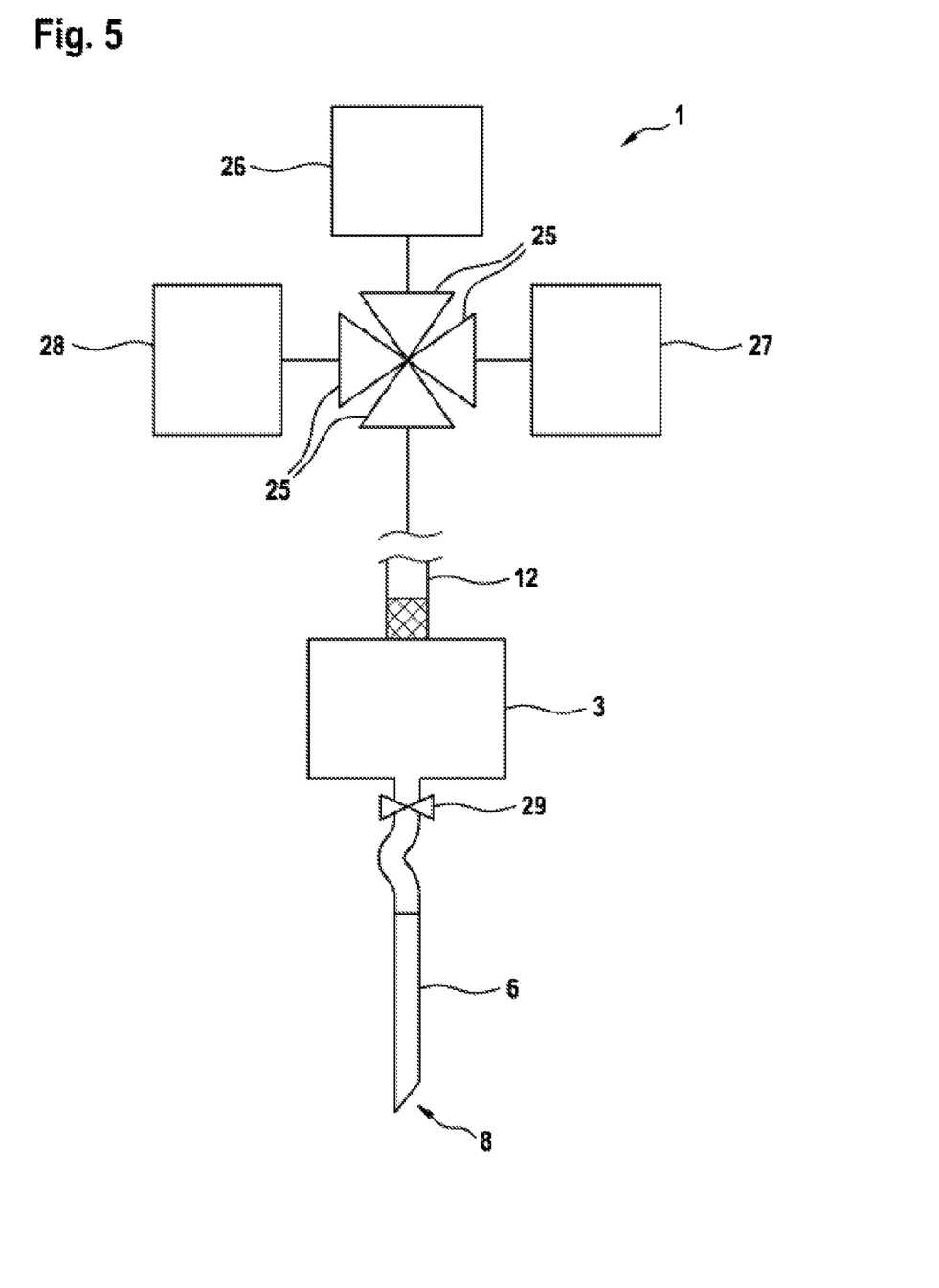
FIG. 5 shows a diagrammatic representation of the specimen chamber, which is connected to the cannula, to a reduced-pressure generation device via valves, to a solvent filling device and to a measuring instrument.

FIG. 5 shows by way of example that the specimen chamber 3 can be connected either to a reduced-pressure generation device 26, to a solvent filling device 27 or to a measuring instrument 28, via in each case separately actuatable valves 25, in order to convey the removed sample into the specimen chamber 3 under reduced pressure, in order to dissolve the sample located in the specimen chamber 3 in a suitable solvent, and in order to be able to transfer the dissolved sample to the measuring instrument 28. The specimen chamber 3 here can be separated from the cannula 6 and thereby sealed in a solvent-tight manner by means of a further valve 29 or a sealing device. It is likewise possible for the dissolved sample to be transferred to the measuring instrument 28 or a further transport container not via the connecting line 12, but instead through the cannula 6.

By means of the device 1 according to the invention, a sample can be removed automatically from the surface 10 of the thin-layer plate 2 from a very small and spatially precisely specified analysis area. With the aid of a spring device 16, 17, essentially complete removal of the separation layer 5 can be achieved in a simple manner and undesired damage to the support plate 4 can be avoided. In the case of a change to a thin-layer plate 2 having other properties, for example with a support plate 4 comprising another material or with a separation layer 5 of different thickness, complex adaptation is unnecessary. With the aid of a displacement device 20, substantially automated provision of a large number of samples, each comprising amounts of specimen with which analyses can subsequently be carried out, can be carried out in a short time.

Even without further comments, it is assumed that a person skilled in the art will be able to utilise the above description in the broadest scope.

Should anything be unclear, it goes without saying that the publications and patent literature cited should be consulted. Accordingly, the complete disclosure content of all applications, patents and publications cited above and below, in particular the corresponding application EP 17187746.7, filed on 24 Aug. 2017, should be incorporated into this application by way of reference.

The invention claimed is:

1. A method for provision of a particulate sample of a specimen to be analyzed from a thin-layer plate (2) in thin-layer chromatography, said method comprising:
   removing the sample from the thin-layer plate (2) from the thin-layer chromatography and feeding the sample to a specimen chamber (3),
   wherein the sample is removed from a surface (10) of the thin-layer plate (2) by a blade (9, 18) disposed at a receiving opening (8) of a cannula (6) and is fed through the cannula (6) to the specimen chamber (3) which is connected to the cannula (6).

2. The method according to claim 1, further comprising generating a reduced pressure in the specimen chamber (3) in order to suck the sample removed from the thin-layer plate (2) by the cannula (6) through the receiving opening (8) into the cannula (6) and through the cannula (6) into the specimen chamber (3).

3. The method according to claim 1, further comprising, after the removal and feeding of the sample, filling the specimen chamber (3) with a solvent in order to dissolve the sample.

4. The method according to claim 1, wherein the cannula (6) with the blade (9, 18) is deflected against a spring force in order to prevent the blade (9, 18) From penetrating into the thin-layer plate (2) with an excessive contact pressure during removal of the sample from the thin-layer plate (2).

5. The method according to claim 1, wherein the cannula (6) and the surface (10) of the thin-layer plate (2) are displaced relative to one another by a displacement device (20) in order to remove the sample from the thin-layer plate (2).

6. The method according to claim 5, further comprising generating an optical image of the surface (10) of the thin-layer plate (2) containing the specimen to be analyzed by an optical recording device and specifying an area on the surface (10) of the thin-layer plate (2) within which the cannula (6) is displaced relative to the surface (10) of the thin-layer plate (2) by the displacement device (20) in order to remove the sample from thin-layer plate (2) by f an evaluation device.

7. The method according to claim 1, wherein the blade (9) forms an edge of the receiving opening (8) of the cannula (6).

8. The method according to claim 1, wherein the blade (18) is arranged at a distance from an edge of the receiving opening (8) of the cannula (6).

9. The method according to claim 1, wherein the blade (18) has a cutting edge which runs in a straight line, at least in part.

10. The method according to claim 1, wherein the cannula (6) with the blade (9) is supported on a supporting device (15) against a spring force of a spring device (16).

11. The method according to claim 1, wherein the cannula (6) and the blade (9, 18) are displaceable relative to the surface (10) of the thin-layer plate (2) by a displacement device (20).

12. The method according to claim 1, wherein the specimen chamber (3) is connected to a reduced-pressure generation device (26).

13. The method according to claim 1, wherein the specimen chamber (3) is connected to a solvent filling device (27) and/or a cleaning-fluid filling device.

14. The method according to claim 1, wherein the device (1) has a displacement device (20) which can be automated, and, by the displacement device (20), the cannula (6) with the blade (9, 18) and the surface (10) of the thin-layer plate (2) can be displaced relative to one another.

15. The method according to claim 1, wherein the blade (18) at the receiving opening (8) of the cannula (6) is deflected against a spring force relative to the receiving opening (8) of the cannula (6) in order to prevent the blade (9, 18) from penetrating into the thin-layer plate (2) with an excessive contact pressure during removal of the sample from the thin-layer plate (2).

16. The method according to claim 1, wherein the cannula (6) with the blade (9) is supported on a supporting device (15) against a spring force of a spring device (16).

17. The method according to claim 1, wherein the blade (18) is supported relative to the cannula (6) or the specimen chamber (3) via a spring device (17).

18. The method according to claim 1, wherein the cannula (6) and the blade (9, 18) are displaceable relative to the surface (10) of the thin-layer plate (2) by a displacement device (20).

19. The method according to claim 1, wherein the blade (18) is sup-ported relative to the cannula (6) or the specimen chamber (3) via a spring device (17).

20. The method according to claim 1, further comprising illuminating the surface of the thin-layer plate with UV light or with infrared light, recording the light emitted by the surface of the thin-layer plate by an optical recording device, and converting the recorded light into an image.

21. The method according to claim 1, wherein the specimen chamber is in fluid communication with a vacuum generation device, and said specimen chamber is separated from a vacuum generation device by a filter device, and said method further comprises generating reduced pressure in the specimen chamber (3) via said vacuum generation device in order to suck the sample removed from the thin-layer plate (2) by the cannula (6) through the receiving opening (8) into the cannula (6) and through the cannula (6) into the specimen chamber (3), wherein sample particles sucked into the specimen chamber are retained therein by said filter device.

\* \* \* \* \*